United States Patent
Shoshany et al.

(10) Patent No.: US 7,144,454 B2
(45) Date of Patent: Dec. 5, 2006

(54) EFFLORESCENCE CONTROL WITH WAX

(75) Inventors: Haggai Shoshany, Kfar Tavor (IL); Amnon Shoshani, Tel Aviv (IL)

(73) Assignee: H.A. Industrial Technologies Ltd., Tel Aviv (IL)

( * ) Notice: Subject to any disclaimer, the term of this patent is extended or adjusted under 35 U.S.C. 154(b) by 0 days.

(21) Appl. No.: 11/103,498

(22) Filed: Apr. 12, 2005

(65) Prior Publication Data
US 2006/0225623 A1   Oct. 12, 2006

(51) Int. Cl.
*C08L 91/06* (2006.01)
*C04B 14/00* (2006.01)

(52) U.S. Cl. .............. 106/270; 106/724; 106/802; 106/822; 106/272

(58) Field of Classification Search ............ 106/272, 106/724, 802, 822, 270
See application file for complete search history.

(56) References Cited

U.S. PATENT DOCUMENTS

| | | | | |
|---|---|---|---|---|
| 5,695,553 | A * | 12/1997 | Claret et al. | 106/778 |
| 5,736,600 | A * | 4/1998 | Karkare et al. | 524/400 |
| 5,743,949 | A * | 4/1998 | Kainz | 106/271 |
| 6,537,366 | B1 * | 3/2003 | Supplee, Sr. | 106/712 |
| 2002/0022688 | A1 * | 2/2002 | Tysak et al. | 524/558 |
| 2004/0122144 | A1 * | 6/2004 | Karkare et al. | 524/284 |

OTHER PUBLICATIONS

Resume and publications of Prof. Moris S. Elsen, no date.
Resume of James R. Eckert, no date.

* cited by examiner

*Primary Examiner*—Elizabeth D. Wood
(74) *Attorney, Agent, or Firm*—Dekel Patent Ltd.; David Klein

(57) ABSTRACT

A method for making a concrete shaped product more resistant to efflorescence, including forming a mixture of a wax blend with a concrete mix into a shaped product, the wax blend including a weight ratio of 50.01% to 99.99% of a main wax and 0.01% to 49.99% of a secondary wax.

7 Claims, No Drawings

EFFLORESCENCE CONTROL WITH WAX

FIELD OF THE INVENTION

The present invention relates generally to efflorescence, and particularly to using wax compositions and mixtures to control, reduce and eliminate efflorescence in concrete shaped products.

BACKGROUND OF THE INVENTION

Efflorescence is a calcium or alkaline salt which forms as a blotchy, powdery or crystalline deposit on the surface of masonry and concrete products. It is due to moisture entering through the masonry, combining with the calcium hydroxide in the cement, and bringing the hydroxide to the surface in a solution which forms crystals when it combines with the carbon dioxide in the air. It is usually white but efflorescence may be yellow, green or brown.

Efflorescence is generally caused by salt-bearing compounds entering the masonry material. Although new, fresh bricks do not generally contain significant amounts of soluble salts, mortar and concrete do have relatively high soluble salt contents. Ground waters that are naturally salt-bearing can also seep into the masonry, as well as other sources of water, such as rain, lawn sprinklers, leaky pipes and others. The amount of efflorescence that occurs is related, inter alia, to the amount of water in the bricks, and their drying time. The more water in the bricks, and the longer it is there, the more chance salts will have to dissolve in it and be brought to the surface as the bricks dry out.

In the prior art, attempts to control efflorescence include waterproof coatings applied to the surface of the masonry units. The application of such coatings is not always effective and is costly in terms of labor, coating materials and time. One of the most common methods is to simply "give up" and brush off the efflorescence deposits with a stiff dry bristle brush after the wall has dried out.

U.S. Pat. No. 6,537,366 to Supplee, Sr. describes a composition for coloring concrete, which includes a hydrophobic efflorescence control agent, such as a stearate-containing compound. Supplee, Sr. states that although stearate-containing compounds (e.g., calcium stearate, zinc stearate, aluminum stearate, among other suitable compounds of stearic acid, salts and derivatives thereof, and mixtures thereof) may be used to minimize or eliminate efflorescence, they are also known to adversely affect the durability of concrete. Concrete durability is a function of the totality of the polymerization of the cementitious materials in a mix. Because efflorescence control agents hinder polymerization, use of efflorescence control agents yield a weaker polymer structure and hence a less durable concrete.

Supplee, Sr. describes a concrete admixture composition that includes about 0.1% by weight to about 85% by weight of a hydrophobic efflorescence control agent; about 0.5% by weight to about 75% by weight of a particulated polymer, the particulated polymer having particle sizes of about 50 angstroms to about 7,000 angstroms; and about 0.001% by weight to about 80% by weight of a colorant in an aqueous dispersion of the total weight of the composition. The composition also includes a property enhancing additive selected from the group consisting of plasticizers, surfactants, rheology modifiers, biological control agents, and a mixture thereof.

The efflorescence control agent may be one of the stearate-containing compounds mentioned above, or may be selected from the group consisting of tall oil fatty acids, vegetable and animal fats, emulsions based on white grease, silicone compounds, siliconates, and siloxanes, waxes, wax emulsions, soaps and fatty acids, vegetable oils and emulsions, petroleum residues, including mineral oil, paraffin, and bitumens, various pozzolanics, including fly ash, blast furnace slag, diatomaceous earth, inert fillers, including talc, bentonite, and siliceous powders, and a mixture thereof. The particulated polymer is selected from the group consisting of styrene-based polymers and copolymers, acrylic-based polymers and copolymers, polyvinyl acetates, polyepoxides, polyurethanes, butadiene rubbers, and a mixture thereof.

SUMMARY OF THE INVENTION

The present invention seeks to provide wax compositions and mixtures to control, reduce and eliminate efflorescence in concrete shaped products, as is described in detail further hereinbelow. Wax may be mixed with the raw materials of the concrete shaped product, resulting in a concrete shaped product with advanced hydrophobic properties (that is, water repelling or resisting, the terms being used interchangeably) that may solve the abovementioned problems of efflorescence.

DETAILED DESCRIPTION OF EMBODIMENTS

The term "concrete shaped product" encompasses concrete products, such as but not limited to, bricks, blocks, tiles, columns, pillars, cinder blocks, pavers, interlocking bricks, blocks and tiles (also referred to as interlocking concrete pavers or pavement stones) which may be molded or otherwise formed into a desired shape. Forming and curing the concrete shaped product may be done at room (ambient) or near room temperature (even including arctic conditions), but may also be done at elevated temperatures (e.g., autoclave curing).

As is well known in the art, concrete is basically a mixture of two components, aggregates and paste. The aggregate component normally includes sand and gravel, pebbles or crushed stone. The paste component normally includes cementing materials, such as but not limited to, Portland cement with or without supplementary cementing materials, water, and air. Accordingly, the term "concrete mix" (or "concrete mixture") refers to the mixture of the aggregates and paste.

In accordance with an embodiment of the present invention, the concrete shaped product may be made resistant to efflorescence by adding a wax blend to the concrete mix. The wax blend may be in the form of an emulsion, suspension, solution, or small solid particles (e.g., flakes, powder, pellets, etc.) or any combination thereof.

A "wax solution" is a homogenous liquid of miscible materials in which wax is dissolved in a main solvent. The wax is in its molecular or ion form.

A "wax emulsion" is a stable dispersion of immiscible materials. It is noted that wax in water emulsions of above-micron size particles necessitate emulsifiers to maintain stability. The emulsifiers prevent the wax particles from adhering to or merging with themselves. Water soluble polymer compounds, such as but not limited to polyvinyl alcohol, may be added to the water phase, for the purpose of controlling the viscosity of the emulsion and improving the adhesion between the wax and other particles.

A "wax suspension" is a buoyant dispersion of immiscible materials. It is noted that wax in water suspensions necessitate constant agitation without which the wax particles will rapidly merge to form a continuous wax phase floating on the water. Water soluble polymer compounds, such as but not limited to polyvinyl alcohol, may be added to the water phase, for the purpose of controlling the viscosity of the suspension and improving the adhesion between the wax and other particles.

"Mixing" encompasses adding, coating, dissolving, pouring, or any other action to make the wax substance part of the concrete mixture which is eventually turned into a finished concrete shaped product.

As is known in the art, certain shaped products, such as interlocking concrete pavers or cinder blocks, may be made with a base mix and a face mix, that is, two mixes are applied during the stone manufacture. The base mix is used to fill a mold to create the paver. Afterwards, the face mix is used to completely fill the mold prior to manufacture. The face mix (also referred to as hard facing) is a thin layer of fine aggregate and cement to the top surface of the concrete paver. The layer is often colored and is used to provide a more intense appearance, greater abrasion resistance, or provide a base for a textured finish. This enables the cost effective use of very special colors in manufacturing the paver.

It has been surprisingly found that when the concrete shaped product is manufactured using a base mix and a face mix, the concrete shaped product may be made resistant to efflorescence by adding a wax blend (or just a wax without a wax blend) substantially just to the face mix alone.

The wax blend may include a weight ratio of 50.01% to 99.99% of a main wax, and 0.01% to 49.99% of a secondary wax. Preferable ratios are 75% to 98% of the main wax and 2% to 25% of the secondary wax. More preferable ratios are 85%–95% of the main wax and 5–15% of the secondary wax.

In accordance with an embodiment of the present invention, the main wax may include a soft macro-crystalline wax (preferably, but not limited to, a soft paraffin wax) with a congealing point in the range of about 10–45° C., a hard macro-crystalline wax (preferably, but not limited to, a paraffin wax) with a congealing point in the range of about 40–85° C., or a mixture thereof. Other macro-crystalline waxes such as plant/insect waxes (bee wax, carnauba wax, candelila wax, bayberry wax, Japan wax, etc.) and synthetic waxes (wax produced from a Fischer-Tropsch process, polyethylene wax, polypropylene wax, etc.), or any mixture thereof may be used as the main wax.

The secondary wax may include a hard or micro-crystalline wax with a congealing point higher than 70° C., and preferably at least 10° C. higher than that of the main wax. The secondary wax is preferably montan wax with a congealing point in the range of about 70–95° C., more preferably 75–85° C. Other hard micro-crystalline waxes, such as but not limited to, natural waxes (peat wax, castor wax, jojoba wax, etc.) and synthetic waxes (wax produced from a paraffin precipitation process, Fischer-Tropsch process, polyethylene wax, polypropylene wax, etc.) or any mixture thereof may be used as the secondary wax.

For example, the main wax may be a macro-crystalline wax and the secondary wax may be montan wax. As another example, the main wax may be a paraffin macro-crystalline wax and the secondary wax may be a paraffin micro-crystalline wax.

In cases of ambient temperature curing of the concrete shaped product, the congealing point of the wax blend is preferably 5–15° C. above the ambient temperature. In cases of autoclave curing of the concrete shaped product, the congealing point of the wax blend is preferably at least 10° C. below the autoclave temperature.

The weight ratio of the wax blend to the total concrete weight is 0.1% to 10%, preferably 0.5% to 7%, and more preferably 1% to 5%.

Although the invention encompasses wax in any form as stated above, it may be advantageous to add the wax as a suspension instead of an emulsion to the concrete mixture. Emulsions have to be stored at the site where the concrete shaped product is produced, and have a limited shelf life. The manufacture of emulsions uses relatively a lot of energy and is relatively costly. In contrast, the raw materials for making the suspension may be much cheaper and much more stable. The wax suspension may be manufactured at the site where the concrete shaped product is produced, and introduced on-line to the shaped product mixture, thereby providing significant savings in energy, storage, manpower, etc. Due to its online production, the wax suspension is not sensitive to storage and/or storage conditions, such as but not limited to, excessive mechanical shear, pumping, excessively low or high ambient temperature, storage agitation, crust formation, particles agglomeration, and the like.

The invention may be better understood by referring to the following non-limiting example:

Standard mixtures of pavers were made from crushed basalt rock, sand, Portland cement and water. A suspension of wax blend was added in various quantities to the face mix only. The base mix was not treated. The wax blend included paraffin wax of congealing point 57–60° C. and montan wax of congealing point 75–85° C. The water phase of the suspension included fully hydrolyzed polyvinyl alcohol (PVA).

The pavers were cured in an ambient temperature 100% humidity chamber for 12 hours and in ambient temperature outdoor storage for 28 days.

The pavers were tested for compressive strength, abrasion, water drop absorption and efflorescence.

Wax blend addition rates and test results of these pavers are shown in Table 1.

TABLE 1

|  | Reference | Sample 1 | Sample 2 | Sample 3 |
| --- | --- | --- | --- | --- |
| Density [kg/m$^3$] | 2310 | 2292 | 2308 | 2325 |
| Wax additive [%] | 0.0 | 1.3 | 2.2 | 3.1 |
| Compressive strength [MPa]* | 53 | 52 | 54 | 53 |
| Abrasion | 4.3 | 4.9 | 4.6 | 4.5 |
| Water drop absorption time [seconds] | 1 | ∞** | ∞** | ∞** |
| Efflorescence appearance test*** | Positive | Negative | Negative | Negative |

Test according to Israel standard specification 376

**Water drops of samples 1, 2, 3 dried out after 3–5 hours without being absorbed in the brick surface

***Efflorescence appearance test was conducted the following way: reference and test pavers were put in a tub containing tap water up to 10 mm below paver surface. The tab was kept outdoors in a shed for a period of 7 days. Water level of the tub was adjusted twice a day to compensate for evaporation. After 7 days the pavers were dried at ambient temperature for 24 hours and inspected visually for efflorescence appearance.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A method for making a concrete shaped product more resistant to efflorescence, comprising:

forming a mixture of a wax blend with a concrete mix, said wax blend comprising about 0.25–2.50% inclusive of a total weight of said mixture, said wax blend having a weight ratio of from about 1:1 to 10:1 of a main wax and 0.01 to a secondary wax, said main wax comprising paraffin wax and said secondary wax comprising montan wax, and forming said mixture of the wax blend and the concrete mix into a concrete shaped product, wherein the wax blend makes said concrete shaped product more resistant to efflorescence.

2. The method according to claim 1, comprising manufacturing the concrete shaped product using a base mix and a face mix, and adding said wax blend substantially just to the face mix alone.

3. The method according to claim 1, wherein said wax blend comprises at least one of: a wax emulsion of said main wax and said secondary wax and at least one emulsifier, a wax suspension that includes said main wax and said secondary wax suspended in a fluid, and a wax solution that includes said main wax and said secondary wax dissolved in a solvent.

4. The method according to claim 1, wherein the wax blend has a congealing point 5–15° C. above ambient temperature.

5. The method according to claim 1, wherein the wax blend has a congealing point at least 10° C. below an autoclave temperature.

6. A method for making a concrete shaped product more resistant to efflorescence, comprising:

partially filling a mold with a concrete base mix and placing a concrete face mix over said concrete base mix, wherein a wax blend is added substantially just to the concrete face mix alone, and curing said concrete base mix and said concrete face mix to form a concrete shaped product, wherein said wax blend in said concrete face mix makes said concrete shaped product more resistant to efflorescence.

7. A concrete shaped product comprising a wax blend mixed with a concrete mix that has been formed into a shaped product, said wax blend comprising about 0.25–2.50% inclusive of a total weight of said mixture, said wax blend having a weight ratio of about 1:1 to 10:1 of a main wax and 0.01 to a secondary wax, said main wax comprising paraffin wax and said secondary wax comprising montan wax.

* * * * *